Patented July 5, 1938

2,122,774

UNITED STATES PATENT OFFICE 2,122,774

STENCIL SHEET

Shinjiro Horii, Kanda-ku, Tokyo, Japan

No Drawing. Application May 7, 1937, Serial No. 141,249. In Japan April 6, 1937

4 Claims. (Cl. 41—38.6)

This invention relates to improvements in stencil sheets for use in duplicating manuscript or typewritten documents, drawings and the like, consisting of a sheet of fibrous material provided with a coating which is impermeable to ink and may be cut through by the type of a writing machine or by a stylus.

Heretofore it has been proposed to prepare a stencil sheet consisting of a porous base, such as Yoshino paper, coated with a material including a gelatinous organic colloid, dispersed in an aqueous medium, an oily softening agent and an inorganic body capable of forming colloid sols in the disperse medium and which prevent sweating out of the oily softening agent.

It has also been proposed to prepare a stencil sheet provided with a coating of coagulated or non-coagulated gelatine, having homogeneously dispersed therethrough an oily softening agent and an organic filler, such as beechwood flour, which prevent sweating out of its ingredients.

In the present invention the stencil sheets are prepared by coating the sheets of a fibrous base, such as Japanese Yoshino paper, with a coating material comprising a gelatinous organic colloid, such as gelatine, dispersed in water, an oily softening agent and an active adsorbent material.

The active adsorbent materials which may be used in the present invention are the substances having the high capacity of adsorption and possessing an amorphous and porous structure in the form of colloidal gel. Preferably, as the active adsorbent materials, (1) various kinds of hydrosilicates as Japanese acid clay, silica gel and sprouted alumina, and (2) various sorts of amorhous carbon such as bone charcoal are employed. Japanese acid and clay and fuller's earth are the well known hydrosilicates. The high capacity for adsorption of the hydrosilicates is principally due to their intimate structure. The adsorptive capacity of the hydrosilicates is exceedingly increased or accelerated by the treatment with various chemical reagents such, for example, as concentrated hydrochloric acid. By the action of chemical reagents, certain constituents of the silicates are soluble and would tend to increase the porosity and the adsorptive capacity of the remaining portion. The substance known in commerce as silica gel is a hydrated form of pure silica, usually containing about 18% of water. It is obtained by precipitating by acid from a solution of sodium silicate, and drying at moderate temperature. It is a hard, semi-transparent, glassy substance, and used in the powdered form of extremely fine porous structure. Specially prepared forms of wood charcoal, commercially known as "perit" or "norit" etc. may be employed independently or in conjunction with hydrosilicate or silica gel. The amorphous and porous structure of the adsorbent materials mix and bond well with the material containing proteins and oily softening agents, and, consequently, tend to maintain the homogeneity of the coating, to give the excellent finish of increased hardness and flexibility and to improve the cutting of the coated sheet, producing clear and even writings by the pressure of a writing machine.

In carrying out the invention a gelatine of high jelly strength is swelled by soaking in water and, afterward, is dissolved in hot water. The solution is then mixed and emulsified with Turkey-red oil and other suitable oily softening agents, such as fatty oils, fatty acid esters, mineral oils, oleic acid, oleyl alcohol and an active adsorbent material, such as hydrosilicate or silica gel, in admixture with dyes or pigments. To the composition there is added a small amount of a suitable solvent, such as cyclohexanol, a hardening agent, such as phenols or their derivatives.

The proportions of the ingredients of the composition may vary according to several circumstances. The following is an example:—

| | Parts by weight |
|---|---|
| Gelatine | 10 |
| Oleic acid mono- or di-glyceride | 5 |
| Glycol oleate | 5 |
| Oleyl alcohol | 5 |
| Heavy mineral oil | 5 |
| Turkey-red oil | 15 |
| Ultramarine blue | 10 |
| Activated Japanese acid clay | 10 |
| Silica gel | 10 |
| Water | 300 |
| Cyclohexanol | 5 |
| Hexamethylenetetramine | 1 |
| Preservative | 1 |

The basic Yoshino paper may be coated with the coating material above described in any desired manner.

What I claim is:—

1. A stencil sheet consisting of a base of fibrous material coated with a composition comprising an organic colloid, an oily softening agent, and an activated Japanese acid clay.

2. A stencil sheet consisting of a base of fibrous material coated with a composition comprising an organic colloid, an oily softening agent and silica gel.

3. A stencil sheet consisting of a base of fibrous material coated with a composition comprising an organic colloid, an oily softening agent, hydrosilicated and silica gel.

4. A stencil sheet consisting of a base of fibrous material coated with a composition comprising gelatine, oleic acid glycerides, glycol oleate, oley alcohol, heavy mineral oil, Turkey-red oil, ultramarine blue, activated Japanese acid clay, silica gel, water, cyclohexanol, hexamethylenetetramine and a preservative.

SHINJIRO HORII.